Nov. 3, 1959  W. L. NEFF  2,910,780
DEVICE FOR DETERMINING THE POSITION OF
FINGER HOLES IN BOWLING BALLS
Filed Feb. 18, 1957  3 Sheets-Sheet 1

INVENTOR.
WILBER L. NEFF
BY
*Buckhorn, Cheatham & Blore*
ATTORNEYS

INVENTOR.
WILBER L. NEFF
BY
Buckhorn, Cheatham + Blore
ATTORNEYS

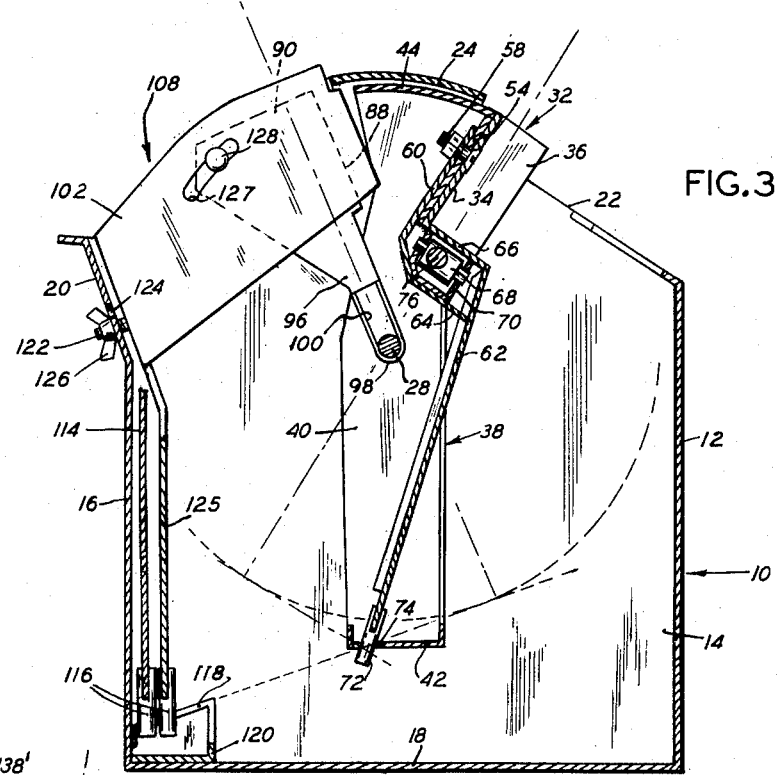
Nov. 3, 1959 W. L. NEFF 2,910,780
DEVICE FOR DETERMINING THE POSITION OF
FINGER HOLES IN BOWLING BALLS
Filed Feb. 18, 1957 3 Sheets-Sheet 3
FIG. 3
FIG. 4  FIG. 5  FIG. 6
FIG. 7
INVENTOR.
WILBER L. NEFF
BY
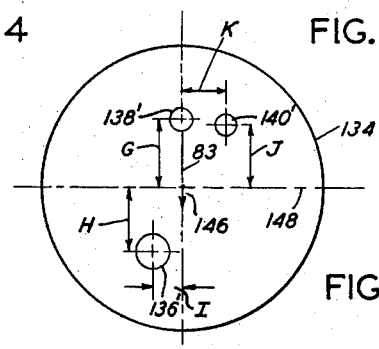
ATTORNEYS United States Patent Office 2,910,780
Patented Nov. 3, 1959

2,910,780

DEVICE FOR DETERMINING THE POSITION OF FINGER HOLES IN BOWLING BALLS

Wilber L. Neff, Eugene, Oreg.

Application February 18, 1957, Serial No. 640,716

8 Claims. (Cl. 33—174)

This invention relates to a device for determining the position of finger holes in bowling balls and more particularly to a device by which the correct location and angle of the finger holes in a bowling ball may be quickly and accurately determined so that the resultant ball with the finger holes drilled therein comfortably fits the hand and can be accurately employed over extended periods of time without cramping or abrasion of the hand of the user.

There are a variety of devices which have been suggested or which are in use for determining the desired position of the finger holes in a bowling ball. Such devices usually either take the form of a simulated bowling ball with a plurality of replaceable and adjustable plugs containing finger holes, or provide scales by which an attempt is made to measure the span between the various fingers. The prior devices have been difficult to employ and have not provided for the determination of both proper distances between the holes and proper angles of the holes in the bowling ball.

In accordance with the present invention, a measuring device is provided which accurately determines the correct distances between the finger holes and the proper angles of such holes with respect to each other and selected axes of the ball. The device has an upper hand receiving surface corresponding to a portion of the spherical surface of a bowling ball and such surface is positioned so that the arm and hand of the prospective bowler can be properly aligned with the measuring device. Finger engaging elements or stalls including a thumb engaging element are provided and are pivoted for movement about two separate axes, one axis extending laterally of the device through the center of and perpendicular to a great circle of the above mentioned spherical surface and the other axis for each element being approximately tangent to such great circle at a point on such circle approximately diametrically opposite the corresponding element. The engaging elements each have internal finger engaging surfaces which are parallel to the central axis of such element, such axis extending through the center of the element and through the corresponding diametrically disposed point referred to above. The finger engaging surfaces of each element are positioned at right angles to each other and such surfaces are spaced from the central axis of each element a distance which is approximately half the average diameter of the finger which is positioned in engagement with such surfaces during the measuring operation.

In use of the measuring device, the hand of the person being measured is placed on the upper hand receiving surface of the device with the forearm extending substantially horizontal and tangent to the great circle mentioned above. The various finger receiving elements are then adjusted to fit the thumb and the other fingers used by the bowler in their natural ball gripping position. Most bowlers employ a ball containing three holes, one for the thumb, one for the middle or second finger and one for the ring or third finger. For a normal hand and a ball containing three holes, the central axis of the finger engaging element for the second finger is maintained in the plane of the great circle mentioned above and the elements for the thumb and third finger are spaced laterally from such great circle. The device contains scales indicating the positions of the various finger engaging elements with respect to directions along the circumference of the great circle referred to above and directions laterally of such great circle. As described in more detail below, these scale readings in conjunction with the radiuses of holes fitting the various fingers, as determined by a separate gauge, enables a jig employed to drill holes in a bowling ball to be easily and rapidly set to drill the holes at the correct positions and angles.

It is therefore an object of the present invention to provide an improved device for determining the position and angles of finger holes in a bowling ball to fit an individual user.

Another object of the invention is to provide a device for determining the position and angle of finger holes for correctly fitting an individual user of a bowling ball by which the correct position and angles of such holes are rapidly and accurately determined.

A further object of the invention is to provide a device for determining the correct positions of finger holes in a bowling ball for an individual user as well as the correct angular relation of said holes in which device finger engaging elements are adjustable about two separate axes at right angles to each other and spaced from each other and scales are provided for indicating the position of such elements when the adjustment is such as to correctly fit the hand of such user.

Another object of the invention is to provide a device for determining the correct position and angle of finger holes in a bowling ball for an individual user in which provision is made for locating the holes so that their central axes extend through an axes of a great circle of the ball passing through the center line of the hole for the second finger of the hand of the user and also extend through points on such great circle on the opposite side of the bowling ball from the corresponding holes.

Other objects and advantages of the invention will appear in the following description of a preferred embodiment of the invention shown in the attached drawings of which:

Fig. 3 is a vertical central section taken from the front to rear of the device;

Fig. 4 is a diagrammatic view showing the outline of a bowling ball in elevation and indicating the position of finger holes in a bowling ball in accordance with the present invention and also indicating the relative position of the finger engaging surfaces of the finger engaging elements;

Fig. 5 is a view similar to Fig. 4 taken at right angles to that of Fig. 4;

Fig. 6 is a diagrammatic plan view showing the outline of a bowling ball and indicating the measurements obtained by the device of the present invention; and Fig. 7 is a view similar to Fig. 6 indicating the manner in which the data obtained by the device of the present invention is employed to drill finger holes in a bowling ball.

Figure 1:
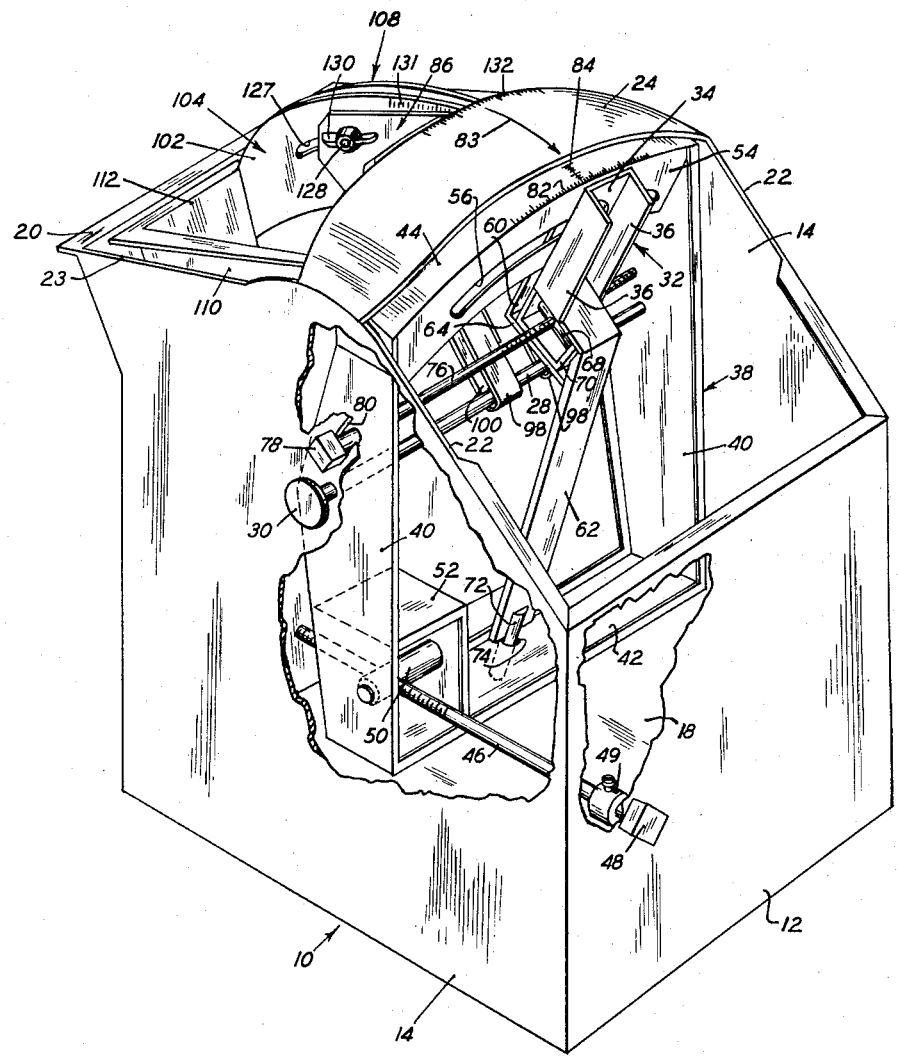
Fig. 1 is an isometric view showing the top, front and one side of the device of the present invention with parts broken away.
Figure 2:
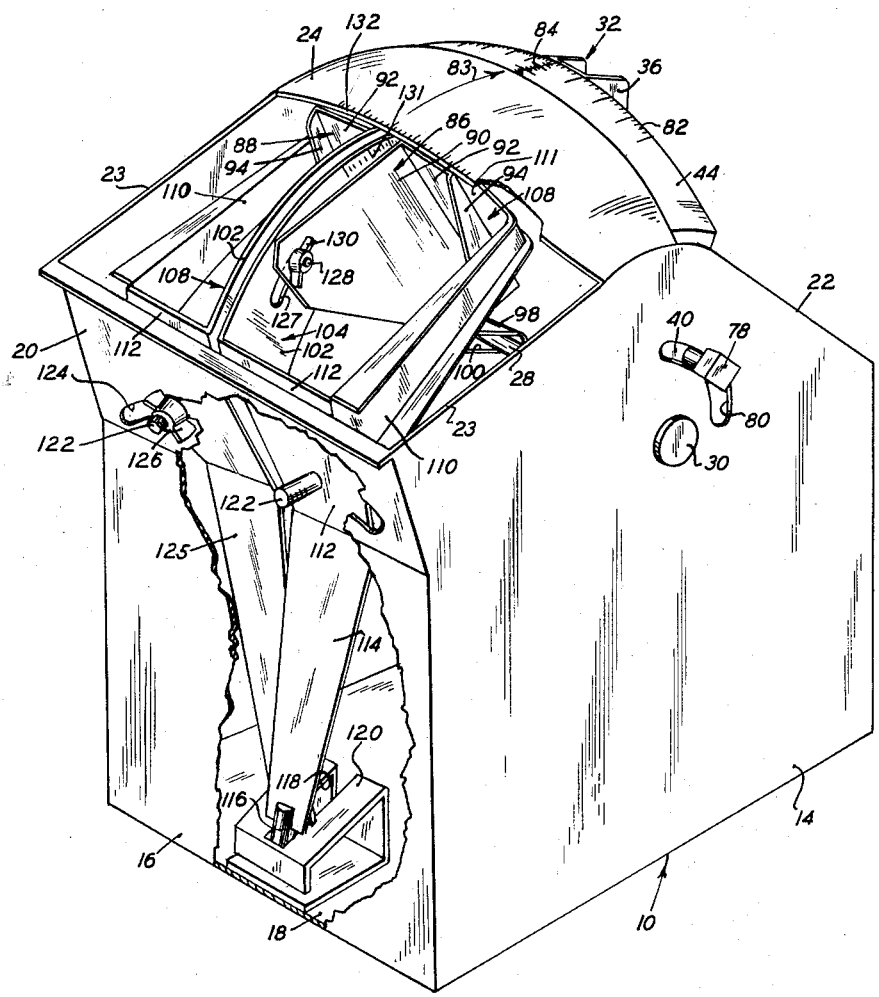
Fig. 2 is a view similar to Fig. 1 showing the top, rear and the same side as Fig. 1, also with parts broken away.

Referring to Figs. 1 to 3 of the drawings, the device of the present invention includes a frame 10 of boxlike formation having a front wall 12, side walls 14, a rear wall 16 and a bottom wall 18. The rear wall 16 has an upper rearwardly inclined portion 20 and the side walls 14 are formed to provide inclined front edge portions 22 and inclined rear edge portions 23, the top of the frame being open except for a hand receiving member 24 extending laterally between the central portions of the side walls 14. The member 24 has an upper surface which is a portion of a spherical surface corresponding to the spherical surface of a bowling ball and such member has a dimension extending forwardly and rearwardly of the device which is substantially narrower than its lateral dimension. The device also has a laterally extending shaft 28 journaled in the side walls 14. The shaft 28 is concentric with and forms the central axis of a great circle of the spherical upper surface of the hand receiving member 24, which is the great circle in a vertical plane extending centrally of the device from front to rear. The plane referred to is the plane of the section of Fig. 3. The shaft 28 is retained in position against endwise movement by a head 30 on one end and a nut (not shown) on the other end engaging the side walls 14.

The device also includes a thumb engaging element or stall 32 having a rear wall 34 and side walls 36 extending forwardly from each side of the rear wall 34. The walls 34 and 36 provide internal thumb engaging surfaces, such surfaces of the side walls 36 being at right angles to the thumb engaging surface of the rear wall. The thumb receiving element 32 is carried by and secured to a cradle 38 positioned within the frame 10. The cradle has two vertically extending side portions 40 adjacent the side walls 14 of the frame 10, such portions being journalled intermediate their ends of the shaft 28. The cradle 38 also includes a bottom portion 42 and has a top portion 44 positioned below the lower surface of the hand receiving member 24, the top and bottom portions joining the upper and lower ends respectively of the side portions 40 to provide a square structure. The cradle 38 can pivot about the shaft 28 and such pivotal movement is controlled by a screw 46 having one end journalled in the front wall 12 of the frame of the device. The screw 46 is held against longitudinal movement with respect to such wall by a head 48 and a thrust collar 49 adjacent the wall 12, the head being adapted to receive a crank or wrench for turning the screw. The screw 46 has its other end threaded through an elongated nut 50 having one end pivotally mounted in one side wall 40 of the cradle 38 and its other end pivotally mounted in a bracket member 52 secured in one lower corner of the cradle 38. The nut 50 has its pivotal axis parallel to the shaft 28 and it will be apparent that turning of the screw 46 by a crank or wrench applied to the head 48 will pivot the cradle 38 about the shaft 28.

The top part of the cradle 38 has a guide flange 54 extending downwardly from the front edge of the top member 44 of the cradle, the ends of the flange being secured to the side portions 40 of the cradle. The flange 54 has its front surface positioned in a plane extending parallel to the shaft 28 and spaced rearwardly of such shaft. The flange 54 has an elongated arcuate slot 56 therein extending laterally of the frame 10 of the measuring device and substantially concentric with the upper edge of the flange 54. The slot 56 has a screw 58 extending therethrough, the screw 58 also extending through an aperture in the rear wall 34 of the thumb receiving element 32 and also being received in an aperture in a backing member 60 secured to the thumb receiving element and extending back of and parallel to the flange 54. The rear wall 34 of the thumb receiving element 32 is thus held in engagement with and guided by the front surface of the flange 54 of the cradle 38.

The walls 34 and 36 of the thumb receiving element 32 and also the backing member 60 are secured to a depending arm 62 forming part of the thumb receiving element 32. Thus the backing member 60 has a lower angular portion 64 secured to the depending arm 62 and the depending arm 62 has an upper rearwardly bent portion 66 supporting the rear wall 34 and side walls 36 of the thumb engaging element 32. The lower portion 64 of the backing member 60 and the upper portion 66 of the depending member 62 are spaced vertically from each other to provide space for an elongated nut 68 having its ends journaled in a bracket member 70 secured between the lower portion 64 of the backing member 60 and the upper portion 66 of the depending element 62. The nut 68 is thereby supported for pivotal movement about an axis extending perpendicular to the shaft 28 and spaced above such shaft.

The depending member 62 has a cylindrical portion 72 extending from its lower end and received in an aperture 74 in the bottom portion 42 of the cradle 38. The position of the lower portion 42 of the cradle 38 is such that the point of engagement of the cylindrical portion 72 with the edges of the aperture 74 is approximately in the above discussed great circle of the spherical surface of the hand receiving member 24 at a point substantially diametrically opposite the thumb receiving element 32. The thumb receiving element 32 is thus mounted for pivotal movement about the point of engagement between the cylindrical portion 72 and the aperture 74 and thus about an axis which is tangent to the great circle, referred to, at such diametrically opposite point. Such pivotal movement of the thumb receiving element 32 is produced by turning a screw 76 threaded into the nut 68 and journaled in one of the side portions 40 of the cradle 38, the screw 76 having a square head 78 to receive a crank or wrench and being restrained against axial movement with respect to such side portions. The screw 76 extends to the exterior of one of the side walls 14 of the device through an arcuate slot 80 to enable pivoting of the cradle about the shaft 28. During such pivotal movement the cylindrical portion 72 slides longitudinally of itself in the aperture 74 since the arcuate slot 56 has a shorter radius than the distance between said slot and the aperture 74.

The front or thumb engaging surfaces of the rear wall 34 of the thumb receiving element 32 is parallel to the shaft 28 and is positioned in a plane which is parallel to and spaced rearwardly of the shaft 28, a distance which is approximately one half the average diameter of the thumb holes usually employed. The inner or thumb engaging surfaces of the side walls 36 are parallel to the arrow 83 and are positioned in planes which are parallel to and spaced laterally of the arrow 83, a distance which is approximately half the average diameter of the usual thumb holes.

The upper surface of the top portion of the cradle 38 has at its front edge a laterally extending scale 82, preferably graduated in thirty-seconds of an inch referred to a great circle of the upper surface of the member 24 each way from a central position indicated by the arrow 83 on the upper surface of the member 24, so that the displacement of the inner surfaces of either one of the side walls 36 from the center of the scale can be read on the scale 82. The upper surface of the top portion 44 of the cradle also contains a scale 84 extending rearwardly of such surface from the front edge thereof. The scale 84 is in alignment with the arrow 83 and is also preferably graduated in the same manner as the scale 82 in thirty-seconds of an inch so that the reading of the scale relative to the front edge of the hand receiving element 24 provides an indication of the pivotal position of the cradle 38 about the shaft 28. Thus, the scale 84 is in the plane of the great circle of the spherical surface of the member 24 referred to above, which great circle is perpendicular to the shaft 28 and extends through the arrow 83 so as to be positioned centrally of the device of the present invention. The scale 82 extends laterally of such great circle.

The device of the present invention also includes a pair of finger receiving elements 86 and 88 which are mirror images of each other and which are positioned to the rear of the hand receiving member 24. The finger receiving elements 86 and 88 each have an inner side wall portion 90 and a front wall portion 92 (Fig. 2), as well as a reinforcing flange 94 at the outer edge of the front wall 92. As shown in Fig. 3, each finger receiving element 86 and 88 has a downwardly extending portion 96 terminating in a strap portion 98 surrounding the shaft 28 and providing a slot 100. As shown in Figs. 1 and 2, the finger receiving element 86 has a similar strap portion 98 surrounding the shaft 28 and providing a slot 100. The two finger receiving elements 86 and 88 are thus pivoted on the shaft 28.

The finger receiving element 86 has its side wall 90 in engagement with the side wall 102 of a supporting member 104 and similarly the finger receiving element 88 has its side wall 90 in engagement with the side wall 102 of a supporting member 104. The reinforcing flanges 94 of the finger receiving elements are similarly in engagement with the side walls 110 of the supporting members. The finger receiving elements are thus guided between the side walls 102 and 110 of the support members in their pivotal movement about the shaft 28, such side walls 102 and 110 being parallel to each other. The support members also have a front wall 111 and a rear wall 112 and are thus of boxlike construction with an open top and bottom. The rear wall 112 of the support member 104 engages the inclined rear wall portion 20 and is guided thereby for lateral sliding movement.

The support member 104 has a depending portion 114 terminating at its lower end in a cylindrical portion 116 received in a slot 118 in a bracket member 120 secured to the rear wall 16 and bottom wall 18 of the frame of the device. The rear wall 112 of the supporting member 104 has a clamping screw 122 projecting rearwardly therefrom through an arcuate slot 124 in the inclined portion 20 of the rear wall of the frame of the device, and it is apparent that the supporting member 104 may pivot about the slot 118. The support member 108 is substantially a mirror image of support member 104 and also has a rear wall 112 having a clamping screw 122 projecting therefrom through the slot 124. Such support member has a depending portion 125 similar to the depending portion 114 of the support member 104, the depending portion 125 also terminating in cylindrical portion 116 received in the slot 118. Both the supporting members 104 and 108 for the finger receiving elements 86 and 88 may thus pivot about the slot 118 by movement of their respective clamping screws 122 in the slot 124. They each may be held in adjusted position by a wing nut 126 on one of the clamping screws 122 so as to clamp the rear wall 112 of the respective support member against the inclined portion 20 of the rear wall 16 of the device.

Referring to Fig. 3, the cylindrical portions 116 of the supporting members 104 and 108 and the slot 118 are positioned that their intersection is approximately on a line tangent to the great circle, above discussed, at a point on such great circle substantially diametrically opposite the finger receiving elements 86 and 88. Such great circle is the great circle of the upper spherical surface of the hand receiving member 26 which is in a plane perpendicular to the shaft 28 and passes through the central arrow 83. The inclined portion 20 of the rear wall 16 is generally parallel to a plane through the rear edge of the hand receiving member 24 and through the axis of the shaft 28. The arcuate slot 124 in the wall portion 20 is substantially concentric with the rear edge of the hand receiving member 24 and the supporting members 104 and 108 pivot laterally about the slot 118, the cylindrical portions 116 moving longitudinally of themselves in the slot 118 since the slot 124 has a shorter radius than the distance between the screws 122 and the slot 118.

As stated above, the finger receiving elements 86 and 88 may also pivot about the shaft 28 which is the perpendicular axis of the great circle, just mentioned. Such pivotal movement is afforded by the strap portions 98 surrounding the shaft 28 and arcuate slots 127 in the inner side walls 102 of the support members 104 and 108, the slots 127 being approximately concentric with the shaft 28. The slots 127 receive clamping screws 128 extending through suitable apertures in the side walls 90 of the finger receiving elements 86 and 88 to provide for pivotal movement of the finger receiving elements 86 and 88 about the shaft 28 when the thumb nuts 130 on the screws 128 are loosened. The finger receiving elements are held in adjusted position when the thumb nuts 130 are tightened. The inner side walls 102 of the support members 104 and 108 for the finger receiving elements have scales 131 thereon for indicating the position of the finger receiving elements 86 and 88 with respect to their supporting members 102 and 104 as a result of their pivotal movement about the shaft 28, such scales being read with reference to the inner surfaces of the front walls 92 of the finger receiving elements. The rear edge of the top or hand receiving member 24 is also provided with a scale 132 to show the relative positions of the finger receiving elements 86 and 88 laterally of the device as a result of the pivotal movements of their supporting members 104 and 108 as guided by the slots 118 and 124. The scale 132 is graduated from the center in both directions and is read with respect to the inner finger engaging surfaces of the side walls 90 and the finger receiving elements 86 and 88. Both scales 130 and 132 are preferably graduated in thirty-seconds of an inch. The rear or finger engaging surfaces of the front walls 92 of the finger receiving elements 86 and 88 are parallel to the shaft 28 and are positioned in a plane which is parallel to and spaced forwardly of the shaft 28, a distance which is approximately one half the average diameter of the fingers to be received in such finger engaging elements. The inner or finger engaging surfaces of the side walls 90 of such finger receiving elements are at right angles to the finger engaging surfaces of the front walls 92. Such finger engaging surfaces of the side walls 90 are parallel to the arrow 83 and are positioned in planes which are parallel to and spaced laterally of such line a distance which is approximately the distance defined above in this paragraph. It will be noted that the finger engaging surface of each of the finger engaging elements including the thumb engaging element are positioned at right angles to each other and extend parallel to a line extending through the central axis of each such element and through the two axes of pivotal movement of such element.

In operation of the device of the present invention, the diameters of the holes which will fit the respective fingers of the individual bowler are first determined. Devices for this determination are known and form no part of the present invention. The preferred device is a block having a series of finger receiving holes bored therein, the holes differing by one-thirty-second of an inch in diameter and being numbered to correspond to the radiuses of such holes in thirty-seconds of an inch. The holes, which comfortably fit the thumb and each of the fingers used by the bowler in bowling, are determined by inserting the thumb and fingers separately into the various holes until a comfortable fit is found. The numbers of the holes, i.e., the radius of the holes corresponding to the thumb and individual fingers, are then recorded. The device of the present invention may be employed for either hand and for determining the position of holes for bowlers which employ either one or two fingers in conjunction with the thumb, but for simplicity will be described in conjunction with a bowler who uses his right hand and the second or middle finger and third or ring finger in conjunction with the thumb. The operation of the device is best described with reference to the diagrams of Figs. 4 to 6, inclusive. Of these figures, Fig. 6 diagrammatically shows the positions of the tops of the thumb receiving element 32 and the finger receiving elements 86 and 88 in plan view in conjunction with the outline 134 of a bowling ball.

The right hand of the bowler is placed palm down on the hand receiving member 24 with the thumb and second and third fingers bent downwardly in or near the respective finger receiving elements with the fore arm horizontal and in alignment with the arrow 83. A circle 136 indicates the position of the thumb in the thumb receiving element 32 and circles 138 and 140 indicate, respectively, the proper positions of the second finger and the third finger in the finger receiving elements 86 and 88, respectively. It will be noted that the circle 138 indicating the second finger has its center in alignment with the arrow 83. This is accomplished by initially adjusting the finger receiving element 86 along the slot 124 of Fig. 2 after loosening the appropriate thumb nut 126 so that the left surface of its side wall 90 (Fig. 6) is offset to the right from the center line indicated by the arrow 83 a distance equal to the radius of a hole fitting the second finger determined, as discussed above. With the second finger in the finger receiving element 86, the finger receiving element 88 is then adjusted laterally, i.e., to the right in Fig. 6 after loosening the appropriate thumb nut 130 until the third finger contacts the finger engaging surfaces of the side wall 90 thereof.

The finger engaging element 88 is initially adjusted to and maintained in zero position with respect to its scale 131 (Fig. 2), which scale extends in a direction opposite to that of the arrow 83. The finger receiving element 86 in the above described alignment with the arrow 83 is adjusted in a direction opposite that of the arrow 83 after loosening the appropriate thumb nut 130 until the rear surface of the front wall 92 engages and fits the second finger. Thus after the initial adjustments referred to above, the finger receiving element 86 in a given measuring operation is adjusted only in a direction in alignment with the arrow 83, while the finger receiving element 88 is adjusted only at right angles to the arrow 83. The thumb receiving element 32 is adjusted both parallel to and at right angles to the arrow 83 by turning the screws 46 and 76. The various adjustments are repeated, if necessary, until there is a comfortable fit of both the fingers and the thumb in the various finger receiving elements. When the adjustments are completed, the surfaces of the fingers and thumb will engage and fit the finger receiving surfaces of the front and side walls of the finger receiving elements and of the rear and one side wall of the thumb receiving element along substantially the full extent of the inwardly extending portions of the fingers and thumb. When the adjustments of the various finger receiving elements provide the fit mentioned, the hand is removed and the positions of the various finger and thumb receiving elements with respect to the scales on the device are read and recorded.

The reading of the laterally extending scale 132 for the finger receiving element 86 is the distance A of Fig. 6 and is always equal to the radius of the hole fitting the second finger indicated by the circle 138. The reading of the scale 131 for the finger receiving element 86 in the direction of the arrow 83 is represented by the distance B of Fig. 6, such distance being from a base line 142 through the zero position of the finger receiving element 88 with respect to movement parallel to the arrow 83. As above indicated, the scale reading on the scale 131 for the finger receiving element 88 is always zero for measurements on a right hand. The lateral position of the finger receiving element 88 as read on the scale 132 is the distance C of Fig. 6. The position of the thumb receiving element 32 with respect to movement in a direction parallel to the arrow 83 as read on the scale 84 is the distance D of Fig. 6 and is measured with respect to arbitrary base line 144 extending laterally of the device. The position of the thumb receiving element with respect to movement at right angles to the arrow 83 as read on the scale 82 is the distance E of Fig. 6. The distance between the base lines 142 and 144 is the distance F of Fig. 6 and such distance is a built in design factor in the device and is known for each measuring device. This distance would be zero if the base line 144 were made to coincide with the base line 142 by properly calibrating the scale 84. In general, it is advantageous to employ two different base lines so that errors in manufacture can be compensated for by specifying the distance F for any given measuring device.

When all of the various scale readings, referred to above, have been determined and recorded, it is easy to locate the external position of the centers of holes 136′, 138′ and 140′ on the surface of a bowling ball, the outline of which is also indicated at 134 in Fig. 7. New bowling balls ordinarily have the location of a central point 146 indicated thereon, as well as the direction indicated by the arrow 83, such markings enabling holes to be bored so that the ball will roll in best balance. In accordance with the present invention, the hole 138′ is bored in alignment with the arrow 83 at a distance represented by the distance G from a line 148 which extends at right angles to the arrow 83 through the point 146. The distance G of Fig. 7 is equal to one half of the distance between the centers of the circles 136 and 138 of Fig. 6 measured in the direction of the arrow 83. This dimension is determined by taking one half of the sum found by adding the distances B, D and F of Fig. 6 and the radiuses of the circles 136 and 138 corresponding to the holes 136′ and 138′. In Fig. 7 the distance H is made equal to distance G so that the center of the hole 136′ is the same distance from the line 148 as the center of the hole 138′. The distance I of Fig. 7 is equal to the distance E of Fig. 6 plus the radius of the circle 136. The distance J of Fig. 7 is equal to distance G of Fig. 7 minus the distance B of Fig. 6 minus the radius of circle 138 plus the radius of the circle 140. The distance K of Fig. 7 is equal to the distance C of Fig. 6 plus the radius of circle 140. The distances G, H, I, J and K of Fig. 7 locate the centers of the holes 136′, 138′, 140′ on the outer surface of the bowling ball indicated by the circle 134, it being understood that these distances are measured on great circles of the ball, one containing the arrow 83 and the other at right angles thereto containing the line 148.

The holes 136′, 138′ and 140′ are bored in the bowling ball 134 so that their axes are parallel to the various finger engaging walls of the elements 32, 86 and 88 in their final adjusted position, as above discussed. A special jig is employed for boring such holes and such jig forms the subject matter of my copending application Serial No. 640,646 filed Feb. 18, 1957. The inclination on angular relationship of the holes 136′, 138′ and 140′ bored in the ball is indicated in Figs. 4 and 5 of which Fig. 4 is a diagrammatic elevation looking in a direction opposite to that of the arrow 83 in Fig. 7 and Fig. 5 is a similar view at right angles to the views of Figs. 4 and 7 and looking toward the right in Fig. 7. Thus the outline 134 of the bowling ball in Fig. 5 is the great circle of the ball through the arrow 83. The central axes of the various finger receiving holes pass through points in such great circle which are substantially diametrically opposite the respective finger and thumb receiving holes. These points are best shown in Fig. 5 in which the axis of the hole 136′ passes through the point 150 in such great circle, the axis of the hole 138′ passes through the point 152 in such great circle and the axis of the hole 140′ passes through the point 154 in such great circle. The points 152 and 154 will always be close together. It will be noted that the axes of all of the holes also pass through the center point 148 which corresponds to the line 148 of Fig. 7 or the center of the shaft 28 of Figs. 1 to 3.

In the diagrams of Figs. 4 and 5, the solid line 36′ of Fig. 4 corresponds to the finger engaging surface of the side wall 36 at the right of the thumb engaging element 32 of Fig. 1. Similarly, the solid line 90′ in Fig. 4 corresponds to the finger engaging surface of the side wall 90 of the finger engaging element 86 of Fig. 2 and the solid line 90'' corresponds to the similar surface of the side wall 90 of finger engaging element 88. Also, the solid line 34' of Fig. 5 corresponds to the thumb engaging surface of the rear wall 34 of the thumb engaging element 32, the solid line 92' of Fig. 5 corresponds to the finger engaging surface of the front wall 92 (Fig. 2) of the finger engaging element 86, and the solid line 92'' of Fig. 5 corresponds to the finger engaging surface of the front wall 92 of the finger engaging element 88. That is to say, the positions of the holes bored in the bowling ball correspond very closely to the positions of the finger engaging elements when in adjusted position for the individual bowler.

While the operation of the device of the present invention has been described with reference to measuring the hand of a right-handed bowler, it is usable in exactly the same manner to measure the hand of a left-hander bowler. In such case, in Fig. 6 the finger engaging element 86 would be moved to the left so that the finger engaging element 88 could occupy the central position in alignment with the arrow 83 and the thumb engaging element 32 would be moved to the right so as to be in position to receive the thumb of the left hand. Similar scale readings would be obtained and converted for use in the jig referred to above. Also, it has been possible to employ the device of the present invention for deformed hands, for example, by positioning the forearm of the bowler at an angle to the arrow 83 of Figs. 1 and 2.

While I have described the preferred embodiment of my invention, it is to be understood that the details thereof may be varied and that the scope of the invention is to be determined by the following claims.

I claim:

1. In a device for determining the position of finger holes in a bowling ball to fit the hand of an individual bowler, which device comprises a frame, a thumb engaging element adjacent the front of said frame and a finger engaging element adjacent the rear of said frame, said elements each being adjustably supported in said frame for pivotal movement about a lateral extending axis perpendicular to and concentric with a circle corresponding to a great circle of a bowling ball, said elements also each being adjustably supported in said frame for lateral pivotal movement about an axis at least approximately tangent to said great circle at a point approximately diametrically opposite the corresponding finger engaging element, said elements each having finger engaging surfaces positioned at right angles to each other and extending parallel to a line through the central axis of such element and through the axes of pivotal movement of such element.

2. In a device for determining the position of finger holes in a bowling ball to fit the hand of an individual bowler, which device comprises a frame, a hand receiving member extending laterally across the upper portion of said frame and having an upper surface corresponding to a part of the spherical surface of a bowling ball, a thumb engaging element adjacent the front of said member and a finger engaging element adjacent the rear of said member, said elements each being adjustably supported in said frame for pivotal movement about a lateral extending axis perpendicular to and concentric with a great circle of said spherical surface, said elements also each being adjustably supported in said frame for pivotal movement about an axis tangent to said great circle at a point approximately diametrically opposite the corresponding finger engaging element, said elements each having finger engaging surfaces positioned at right angles to each other and extending parallel to a line through the central axis of such element and through the axes of pivotal movement of such element.

3. In a device for determining the position of finger holes in a bowling ball to fit the hand of an individual bowler, which device comprises a frame, a thumb engaging element adjacent the front of said frame and a finger engaging element adjacent the rear of said frame, said elements each being adjustably supported in said frame for pivotal movement about a lateral extending axis perpendicular to and concentric with a circle corresponding to a great circle of a bowling ball, said elements also each being adjustably supported in said frame for pivotal movement about an axis tangent to said great circle at a point approximately diametrically opposite the corresponding finger engaging element, said elements each having finger engaging surfaces extending substantially parallel to and spaced from a line through the center of the corresponding element and through said lateral extending axis and said point opposite such corresponding element, said surfaces of each said element being at right angles to each other, one of said surfaces of each element being spaced from said line in the direction of said great circle and another of said surfaces of each element being spaced from said line in a direction laterally of said great circle.

4. In a device for determining the position of finger holes in a bowling ball to fit the hand of an individual bowler, which device comprises a frame, a thumb engaging element adjacent the front of said frame and a finger engaging element adjacent the rear of said frame, said elements each being adjustably supported in the upper portion of said frame for pivotal movement about a first axis extending laterally of said frame, said axis being spaced below the top of said elements a distance approximately equal to the radius of said ball, said elements also each being adjustably supported in said frame for pivotal movement about a second axis extending at right angles to said first axis and spaced below said first axis a distance approximately equal to the radius of said ball, at least one of said elements being mounted in a cradle pivoted in said frame for pivotal movement about said first axis, said one element being pivotally mounted in said cradle for pivotal movement about said second axis, said elements each having finger engaging surfaces positioned at right angles to each other and extending parallel to a line through the central axis of such element and through the axes of pivotal movement of such element.

5. In a device for determining the position of finger holes in a bowling ball to fit the hand of an individual bowler, which device comprises a frame, a hand member extending laterally across the upper portion of said frame and having an upper surface corresponding to a part of the spherical surface of a bowling ball, a thumb engaging element adjacent the front of said member and a pair of finger engaging elements adjacent the rear of said member, said elements each being adjustably supported in said frame for pivotal movement about a lateral extending axis perpendicular to and concentric with a great circle of said spherical surface, said elements also each being adjustably supported in said frame for pivotal movement about an axis perpendicular to and spaced below said laterally extending axis a distance approximately equal to the radius of said ball, said element each having finger engaging surfaces extending substantially parallel to and spaced from a line through the center of the corresponding element and through said lateral extending axis and said point opposite such corresponding element, said surfaces of each element being at right angles to each other, one of said surfaces of each element being spaced laterally from said line and another of said surfaces of each element being spaced along said great circle from said line, said device having scales thereon for indicating the positions of said elements relative to said frame.

6. In a device for determining the position of finger holes in a bowling ball to fit the hand of an individual bowler, which device comprises a frame, a thumb engaging element adjacent the front of said frame and a finger engaging element adjacent the rear of said frame, said elements each being adjustably supported in the upper portion of said frame for pivotal movement about a first axis extending laterally of said frame, said axis being spaced below the top of said elements a distance approximately equal to the radius of said ball, said elements also each being adjustably supported in said frame for pivotal movement about a second axis extending at right angles to said first axis and spaced below said first axis a distance approximately equal to the radius of said ball, at least one of said elements being mounted in a support element for pivotal movement about said first axis, said support element being mounted in said frame for pivotal movement about said second axis, said elements each having finger engaging surfaces positioned at right angles to each other and extending parallel to a line through the central axis of such element and through the axes of pivotal movement of such element.

7. In a device for determining the position of finger holes in a bowling ball to fit the hand of an individual bowler, which device comprises a frame, a thumb engaging element adjacent the front of said frame and a finger engaging element adjacent the rear of said frame, said elements each being adjustably supported in the upper portion of said frame for pivotal movement about a first axis extending laterally of said frame, said axis being spaced below the top of said elements a distance approximately equal to the radius of said ball, said elements also each being adjustably supported in said frame for pivotal movement about a second axis extending at right angles to said first axis and spaced below said first axis a distance approximately equal to the radius of said ball, at least one of said elements being mounted in a cradle pivoted in said frame for pivotal movement about said first axis, said one element being pivotally mounted in said cradle for pivotal movement about said second axis, and another of said elements being mounted in a support element for pivotal movement about said first axis, said support element being mounted in said frame for pivotal movement about said second axis, said elements each having finger engaging surfaces positioned at right angles to each other and extending parallel to a line through the central axis of such element and through the axes of pivotal movement of such element.

8. In a device for determining the position of finger holes in a bowling ball to fit the hand of an individual bowler, which device comprises a frame, a thumb engaging element adjacent the front of said frame and a finger engaging element adjacent the rear of said frame, said elements each being adjustably supported in the upper portion of said frame for pivotal movement about a first axis extending laterally of said frame, said axis being spaced below the top of said elements a distance approximately equal to the radius of said ball, said elements also each being adjustably supported in said frame for pivotal movement about a second axis extending at right angles to said first axis and spaced below said first axis a distance approximately equal to the radius of said ball, at least one of said elements being mounted in a cradle pivoted in said frame for pivotal movement about said first axis, said one element being pivotally mounted in said cradle for pivotal movement about said second axis, and another of said elements being mounted in a support element for pivotal movement about said first axis, said support element being mounted in said frame for pivotal movement about said second axis, said device having a pair of scales adjacent each of said elements extending at right angles to each other to indicate the adjusted position of said elements in said frame, said elements each having finger engaging surfaces positioned at right angles to each other and extending parallel to a line through the central axis of such element and through the axes of pivotal movement of such element.

References Cited in the file of this patent

UNITED STATES PATENTS

| | | |
|---|---|---|
| 2,693,034 | Watson | Nov. 2, 1954 |
| 2,709,853 | Rassner | June 7, 1955 |
| 2,726,454 | Belski | Dec. 13, 1955 |
| 2,799,943 | Shetler | July 23, 1957 |